H. W. PEARSALL.
Tables.

No. 138,431. Patented April 29, 1873.

Witnesses.
Alex Davidson
Geo. W. Rockwell

Inventor.
Henry W. Pearsall
Per H. S. Abbot
Atty.

UNITED STATES PATENT OFFICE.

HENRY W. PEARSALL, OF EMPORIA, KANSAS.

IMPROVEMENT IN TABLES.

Specification forming part of Letters Patent No. 138,431, dated April 29, 1873; application filed October 19, 1872.

*To all whom it may concern:*

Be it known that I, HENRY W. PEARSALL, of Emporia, Kansas, have invented certain new and useful Improvements in Tables, of which the following is a specification:

The nature of my invention consists in the construction of a top for tables, counters, and other places where marble is used, made of plaster of Paris and covered with glass, as will hereafter be more fully set forth.

Figure 1:
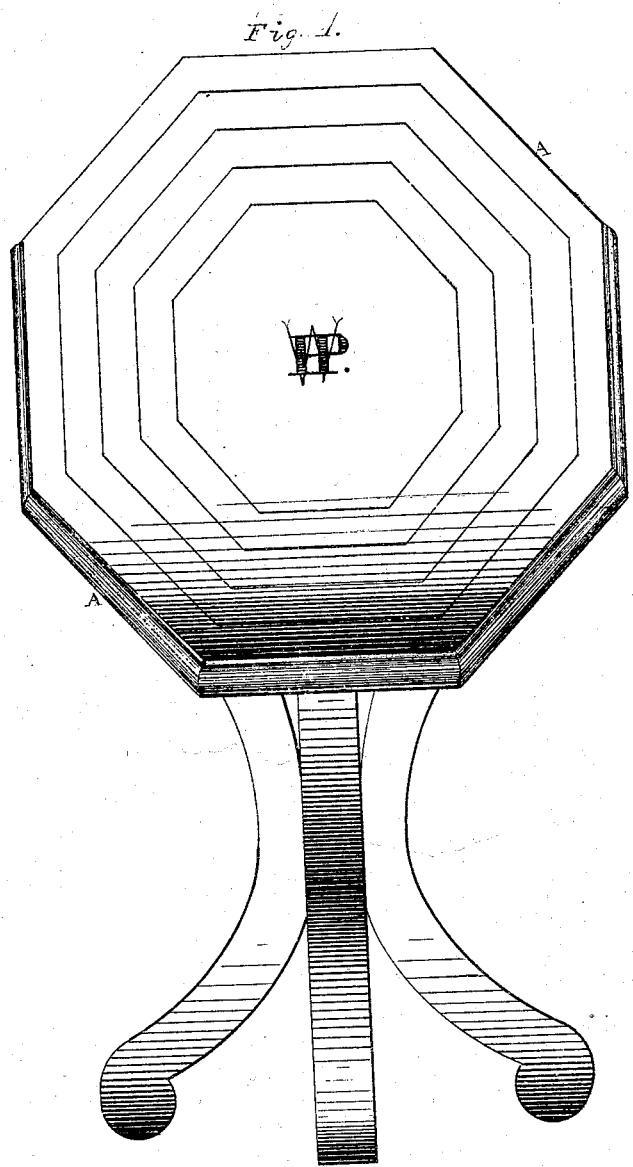
Figure 2:
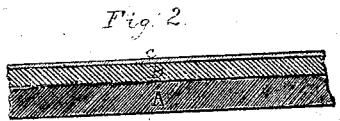

The accompanying drawing, Figure 1 is a perspective of a table embodying my invention. Fig. 2 is a section of the top.

A is a common center-table, having upon its top a bed of plaster of Paris, or its equivalent, B, and covered over by a plate of glass, c.

The plaster of Paris is of any suitable thickness, and for the purpose of making the table as ornamental as possible it is made of a number of colors, arranged in any desired manner, so as to produce beautiful designs, and may be ornamented still more, if desired, by pictures painted upon or placed under the glass. The glass over its face is of sufficient thickness not to be easily broken, and, being transparent, it shows the designs and colors of the bed beneath with great clearness and beauty.

The bed formed by the combination of the two substances is cheaper and far more ornamental than marble, and can be used upon the tops of tables, counters, or wherever marble is now used.

Having thus described my invention, what I claim, and desire to secure by Letters Patent, is—

A table or counter top, made of a bed of plaster of Paris, or its equivalent, and covered with glass, substantially as set forth.

In testimony that I claim the foregoing I have hereunto set my hand.

HENRY W. PEARSALL.

Witnesses:
  E. M. FORDE,
  T. N. SEDGWICK.